United States Patent Office 3,424,410
Patented Jan. 28, 1969

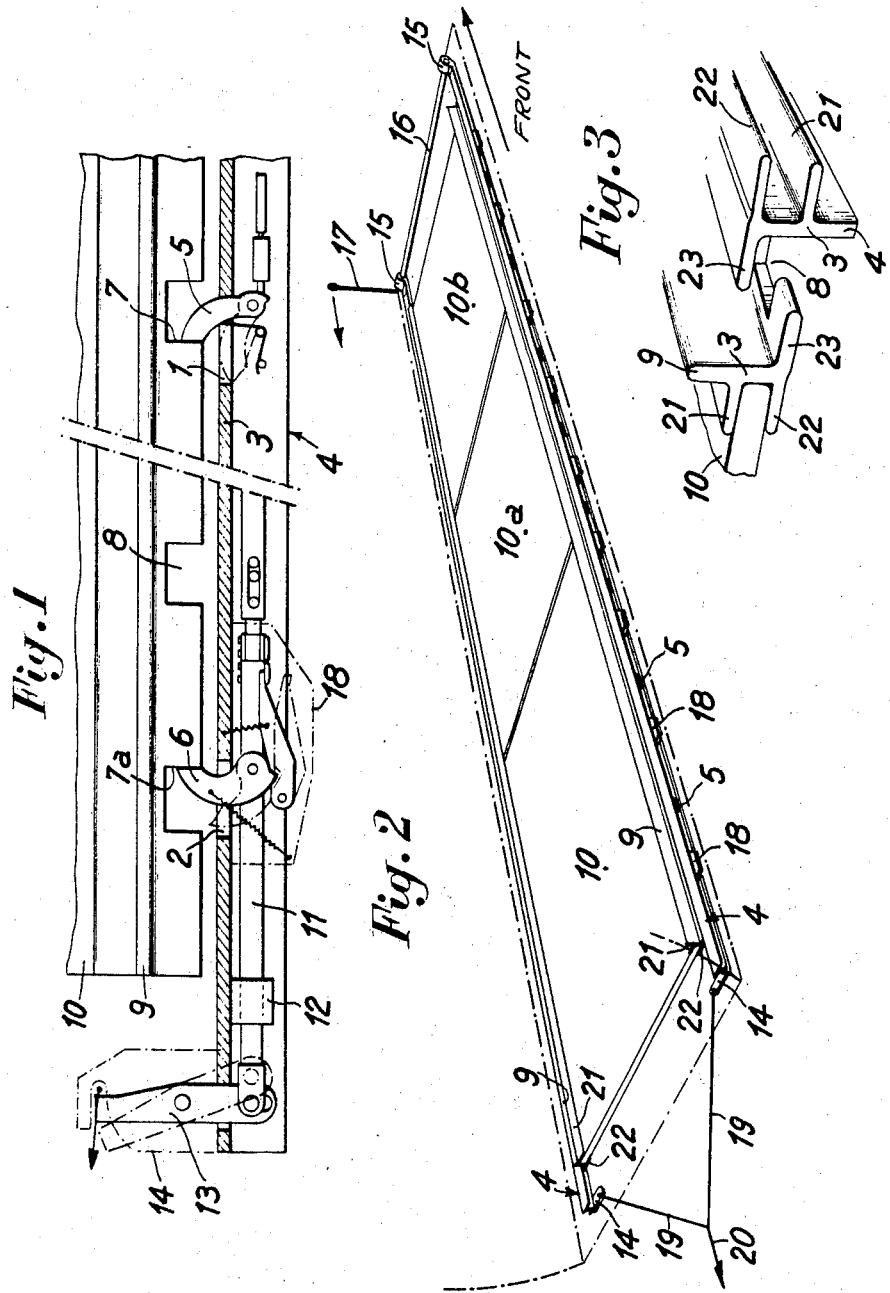

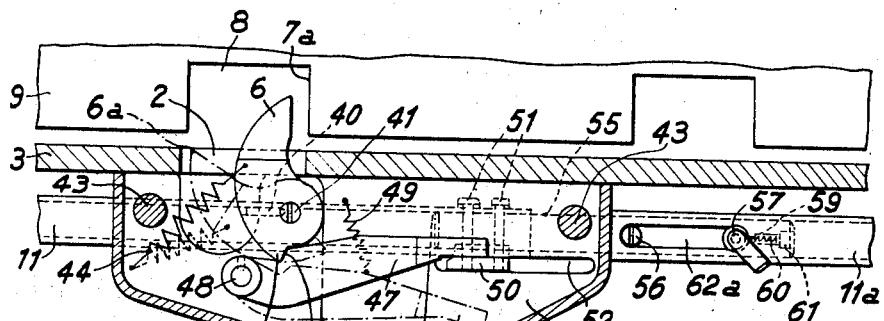
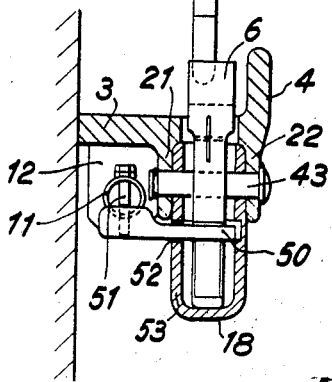
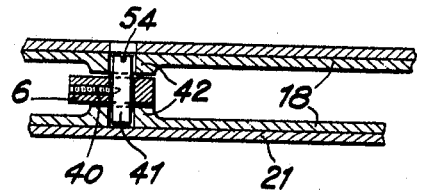
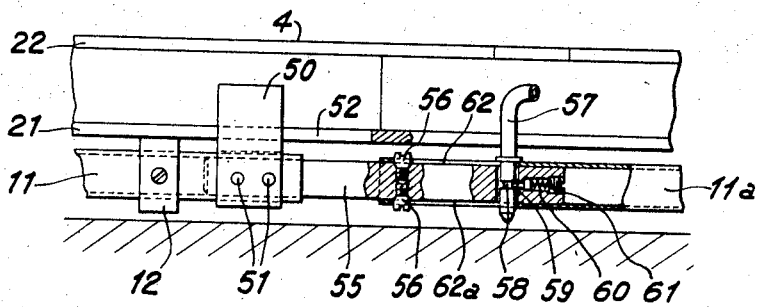

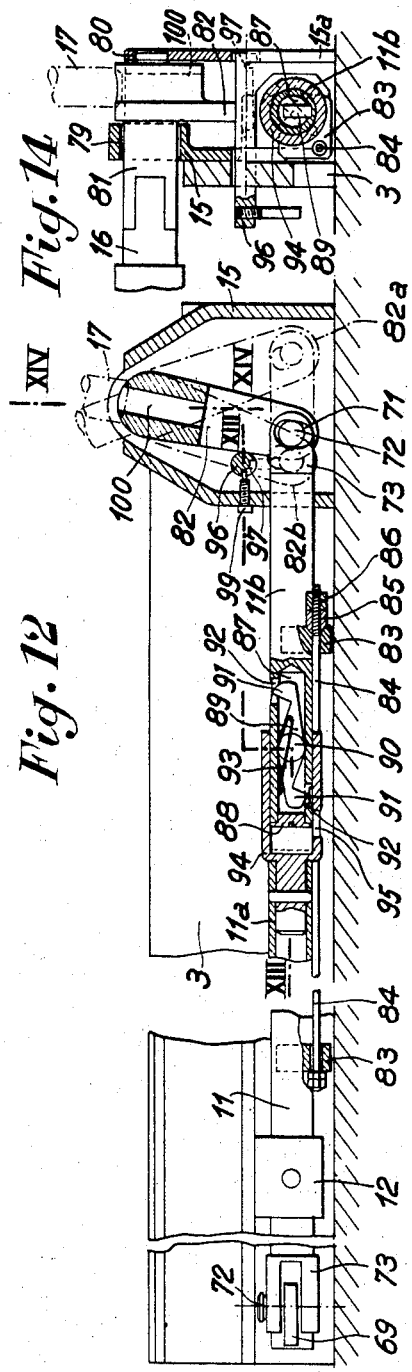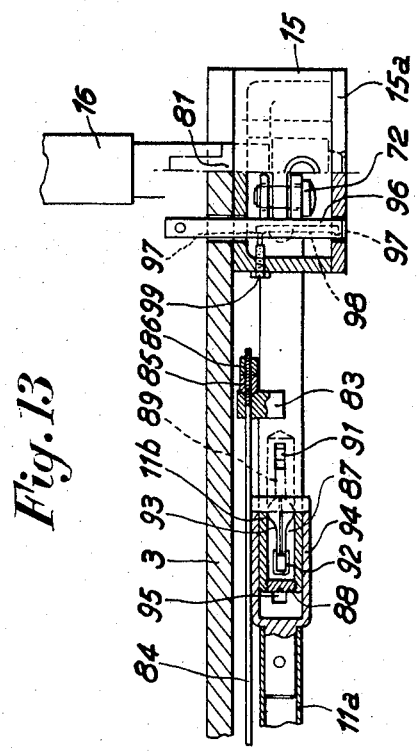

3,424,410
DEVICE FOR GUIDING AND SECURING PARACHUTING PLATFORMS IN AIRCRAFT
Henri Galaup, Toulouse, France, assignor to French State, represented by the Minister of Armed Forces, Ministerial Delegation for Munitions, Technical Direction of Land Munitions, Toulouse, Haute Garonne, France
Filed Jan. 17, 1967, Ser. No. 609,928
Claims priority, application France, June 7, 1966, 64,391, Patent 1,492,163
U.S. Cl. 244—137     6 Claims
Int. Cl. B64c 1/22, 1/24; B64d 9/00

ABSTRACT OF THE DISCLOSURE

In this device the loaded platforms are guided laterally between two parallel rails secured to the aircraft frame structure; these rails carry two series of pawls of which one series locks the platforms against forward motion and the other series locks the platforms against backward motion in relation to the aircraft. A parachute-controlled system is provided at the rear of the aircraft for unlocking the release locks and a manual control provided at the forward end of the device permits of locking either all the platforms or only some of them.

---

This invention relates to an assembly of means which, when incorporated in the equipment of loading compartments of aircraft designed for missions consisting in transporting and parachuting loads carried by platforms, are capable of performing under safety conditions meeting all flight and jettisoning requirements the combined guiding and stowing of these platforms inside said compartments.

While being useful for solving all air transport problems in the whole, this assembly of means is remarkable in that it is capable not only of stowing loads in the transverse and vertical direction by means of a pair of lateral guide rails disposed symmetrically with respect to the longitudinal center line of the aircraft, but also of retaining these loads against any movements in the axial direction of the aircraft, by means of a combination of holding pawls carried by said rails.

The same assembly of means is characterized by the essential fact that it comprises two symmetrical series of pawls of two different types, to be hereinafter referred to as the "abutment pawls" and "retaining pawls" respectively, of which the former which are adapted to prevent any movement of the platforms in the forward direction and the latter to prevent the untimely escape of these platforms to the rear of the compartment until they are released, these various pawls engaging studs or the sides of notches formed to this end on the external wings of a pair of lateral longitudinal section members of said platforms.

The combination of means proposed herein is further characterized by the specific features set forth hereinafter:

The relative or transverse spacing of the pair of guide rails extending externally of two parallel trains of carrier rollers throughout the length of the loading compartment of the aircraft concerned is so calculated that these guide rails can receive loading platforms of any types, whether French or foreign made, presently into use, these rails having if desired extensions on the loading ramp of the aircraft where their track is slightly wider to facilitate the centering of said platforms.

The abutment pawls provided on the pair of guide rails and of which the number is subordinate to the strength requirements imposed by safety regulations, are adapted to pivot freely towards the rear end of the loading compartment, so that they can automatically recede under the pressure exerted thereon by the platforms during their outward or release movement.

The same pawls which, preliminary to the introduction of said platforms into the compartment, are brought to their retracted position by the operator entrusted with the loading, who simply pushes them with the foot, are each responsive to a lock pin holding them in this position until this pin is manually pulled to retract same and thus free said pawls, these pawls thus automatically resuming their initial projecting abutment position under the action of an antagonistic spring.

The retaining pawls (the number of which is subordinate in turn to the above-mentioned safety requirements) are each locked in their operative position by a level formed with a catch and adapted to lock by itself a keeper rigid with a linkage system to which it is only necessary to impart a movement of translation moving said keeper to its retracted position and thus releasing the catch lever responsive thereto and therefore the pawl proper which, under these conditions, can either be automatically retracted by the thrust produced by the previously retained loading platform in the jettisoning or discharge direction, or be manually brought to either of its two opposite retracted or set positions.

The two symmetrical and complementary linkages controlling respectively one and the other of said two lateral series of retaining pawls equipping similarly the two guide rails are adapted to slide in axial bearings provided to this end on said rails, said linkages having their opposite ends each anchored to the driving arms of two control cases separately disposed fore and aft of the loading compartment, the two front cases of the four included in the arrangement being kinematically interconnected by means of a transverse coupling shaft adapted to warrant the perfect synchronism of the movements of said lateral series of retaining pawls.

The aforesaid linkages are so arranged that they can act either upon the whole of the retaining pawls or upon only part thereof, and to this end they consist of a plurality of successive sections responsive to two connecting systems, the first connecting system, independent of the emergency jettisoning control, being intended for rigidly interconnecting any adequate and suitable number of said linkage sections with a view to permit a partial or total release and jettisoning, the second connecting system affording the possibility of controlling from the front end of the compartment and without the assistance of any control parachute either a partial emergency jettisoning, or gravity jettisoning of small platforms, or alternately the complete emergency jettisoning of the complete load.

The two control cases disposed at the rear end of the loading compartment control respectively a rocker having the relevant linkage attached to one of its arms, its other arm having attached thereto one of the two runs of a release strap connecting said rockers either to a jettisoning parachute jointly coupled to the platform to be jettisoned and of which the opening causes this platform to be extracted from the compartment, or to the aforesaid control parachute of which the only function consists in releasing the retaining pawls concerned.

Both front control cases (of which the operations are synchronized by means of the transverse coupling shaft interconnecting them) are each provided with a driving arm having attached thereto the front end of the linkage leading in front thereof, and on or both of said front control cases are further adapted to be equipped with a detachable control lever adapted to be operated by the jettison personnel for imparting to the thus kinematically conjugated driving arms movements having two different angular amplitudes for controlling respectively the one the gravity or partial emergency jettisoning, and the other the complete emergency jettisoning.

The advantages and improvements resulting from the present invention will appear more clearly as the following description proceeds with reference to a specific form of embodiment of the assembly of means constituting the subject-matter thereof, given by way of example and illustrated in the accompanying drawings. In the drawings:

FIGURE 1 is a horizontal section, adequately broken away, showing the devices equipping the right-hand rear portion of the loading compartment of an aircraft and comprising the rocker for driving the rear control case, one section of the linkage connecting said rocker to the first retaining pawl, the latter being followed by an abutment pawl;

FIGURE 2 is a perspective diagrammatic view of the assembly of means according to this invention which is adapted, in this specific example, to receive three loading platforms;

FIGURE 3 is a perspective view showing the cross-sectional contour of the beams constituting respectively the guide rails and the longitudinal members disposed on either side of the platforms;

FIGURE 6 is a part-sectional and plan view of a retaining pawl with its locking mechanism;

FIGURE 7 is a corresponding end elevational view;

FIGURE 8 illustrates in section the assembly comprising the retaining pawl and its case clamped between the two external wings of the guide rails, the section being taken along the vertical longitudinal plane containing the geometrical axis of oscillation of said pawl;

FIGURE 9 is a side elevational and part-sectional view of the linkage, showing the keeper of the catch lever rigid with said linkage, and a lock bolt for detachably interconnecting two adjacent sections thereof;

FIGURE 12 is an elevational and part-sectional view showing one of the two front control cases having their driving arm connected to the head of the relevant linkage, together with the specific connecting means whereby the partial or complete jettisoning can be controlled from the front end of the loading compartment;

FIGURES 13 and 14 are respectively horizontal and vertical sectional views of the same device, the sections being taken upon the lines XIII—XIII and XIV—XIV of FIGURE 12;

Figure 4:
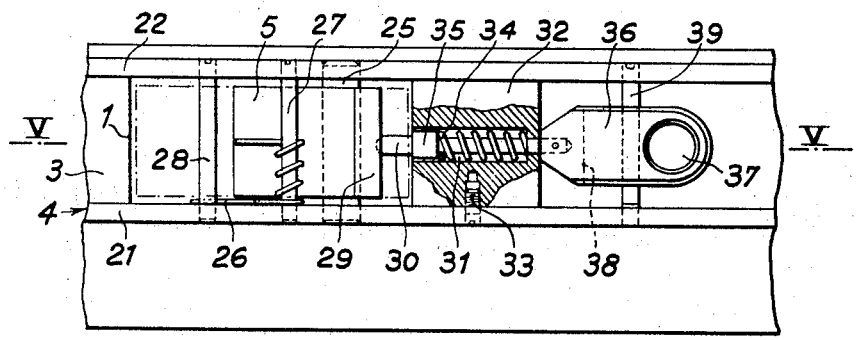
FIGURE 4 is a side elevational view of an abutment pawl with its locking mechanism.

Referring firstly to FIGURE 1 of these drawings, the arrangement according to this invention comprises an abutment pawl 5 and a retaining pawl 6 shown in their operative position and extending through apertures 1 and 2 provided therefor in the vertical web 3 of a guide rail 4, the two outer faces of these pawls engaging respectively the rear side 7 and the front side 7a of a pair of notches 8 formed at spaced and adequately selected intervals in the outer wings of longitudinal side members 9 fitted on the loading platform of which one marginal portion is visible at 10.

This figure further illustrates the rear portion of a linkage 11 adapted to slide in supporting bearings such as 12 secured to the vertical web 3 of guide rail 4, this linkage having one end attached to one arm of a driving rocker 13 of the rear control case shown diagrammatically at 14, the opposite arm of this rocker being attached to one of the runs of release of jettisoning strap 19.

In FIGURE 2, illustrating a complete assembly of the proposed means mounted on the floor of the loading compartment of an aircraft, there are shown two guide rails 4 receiving the pair of side members 9 of three successive platforms 10, 10a and 10b having mounted at their ends the rear and front control cases 14, 15 interconnected by a shaft 16, one of these control cases being provided with its control lever 17.

Disposed at proper intervals along these rails are the above-described abutment pawls 5 and the retaining pawls 6 concealed in this example by protection cases 18. Finally, at the rear end of the assembly a release strap 19, shown in diagrammatic form, is connected to the rockers of control cases 14 by means of a traction cable 20 issuing from the parachute.

As shown in the detail view of FIGURE 3, the guide rails 4 and side members 9 disposed along the platform 10 are cut from the same metal section having a T-shaped cross-sectional contour with the central web 3 provided intermediate its ends with an additional lateral flange parallel to the wing 22 constituting one of the transverse flanges of the T and co-acting therewith to constitute a support either to the pivot pins of the various pawls or to the longitudinal edges of platform 10.

This FIGURE 3 further evidences the fact that the rails 4 and side members 9 have their contours disposed head-to-tail and their relative positions are such that their flange 23, preferably of slightly greater thickness than the other flanges 21, 22, will somewhat overlap each other in order simultaneously to guide the platforms in the transverse direction and efficiently hold these platforms in a stable position precluding any possibility of accidental escape from the rails. This FIGURE 3 also shows in this thicker flange 23 one of the multiple notches 8 formed therein for receiving the various pawls.

Figure 5:
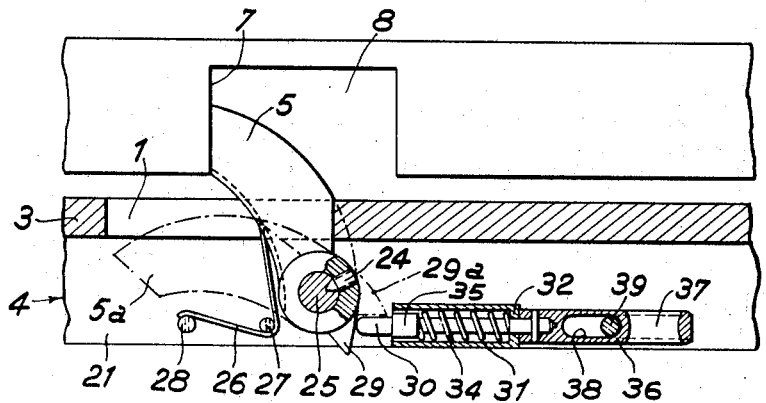
FIGURE 5 is a part-sectional and plan view of the same device, the section being taken upon the line V—V of FIGURE 4.

As clearly and jointly disclosed by FIGURES 4 and 5, each abutment pawl 5 is fastened by a set screw 24 to a shaft 25 rotating freely in a pair of aligned bearing-forming bores formed to this end through the two parallel flanges 21 and 22 of guide rail 4.

This pawl is constantly urged by a return spring 26 wound on a first pin 27 and reacting against another pin 28 through the aperture 1 formed for this purpose in the web 3 of rail 4 to its operative position in which, by engaging the front end of this aperture 1, its projecting nose bears against the rear face 7 of a notch 8 formed in the corresponding side member of the platform.

This pawl 5 is completed by a prismatic catch 29 engaged by a spring-loaded lock bolt 30 slidably mounted in a cylindrical chamber 31 formed in a distance-piece 32 secured by set screws such as 33 to the flanges 21 and 22 of rail 4.

An antagonistic coil compression spring 34 bearing against the annular bottom of chamber 31 and engaging the neck or shoulder 35 of lock bolt 30 constantly urges this bolt 30 towards the catch 29. Finally, secured to the shank of said lock bolt 30 is a control pull-member 36 in which a grip hole 37 followed by an elongated longitudinal hole 38 are formed, in directions extending at right angles to each other, the elongated hole 38 receiving with a certain free motion another cross-pin 39 for limiting in either direction the permissible movement of translation of said lock bolt 30.

The pawl is adapted to be retracted prior to the introduction of the platform into the loading compartment by depressing the pawl to the position shown in dot-and-dash lines in FIGURE 5, so as to produce the pivotal movement of this pawl, during which the lock bolt 30, after having been forced into chamber 31 by the catch 29, will snap back under the force of spring 34 to the projecting position shown in the drawing so as to lock the catch 29 in position 29a and therefore the pawl in its retracted position.

The tripping operation is obtained very simply by exerting on the pull member 36 a traction sufficient to cause the lock bolt 30 to release the pawl catch 29 which, urged by the return spring 26, will automatically resume its operative position 5.

In FIGURES 6, 7 and 8 there is shown a retaining pawl 6 fastened by a set screw 40 to a vertical pin 41 pivoting freely in a pair of aligned bearing-forming bores formed in a pair of internal symmetrical bosses 42 formed in a case 18 fitted between the flanges 21 and 22 of guide rail 4 and secured thereto by a pair of cross pins 43.

In the operative position shown in thick lines in FIGURE 6 this pawl extends through the aperture 2 formed in web 3 of said rail, the pawl portion which emerges above this web registering with the front face 7a of a notch 8 formed in the relevant longitudinal side member 9 of the platform which is to be retained by said pawl against any undesired movement towards the rear end of the loading compartment.

This retaining pawl 6, constantly urged to its retracted or inoperative position by a tension spring 44, is locked in its operative position by a catch 45 formed integrally therewith and engaging a corresponding notch 46 of a trip lever 47 also solid with a pivot pin 48 fulcrumed in a pair of aligned bearing-forming bores formed in the side members of case 18, this trip lever 47 being responsive to a return spring 49 constantly urging said trip lever towards the pawl 6.

FIGURES 6, 7 and 9 further illustrate the provision of a stop member 50 secured by screws 51 of a tubular element of linkage 11 and which, by extending through an elongated aperture 52 formed to this end in the lower flanges 53 of case 18, is adapted to engage and thus lock the end portion of lever 47.

The linkage 11 is adapted to slide freely in supporting bearings such as 12 solid with the web 3 of guide rail 4, but the stop member 50 in smooth sliding contact with the edges of said aperture 52 can only perform movements of translation, whereby said linkage is safely prevented from accomplishing any untimely rotational movement, the stop member 50 being on the other hand constantly and properly directed for efficiently locking the lever 47.

The device described hereinabove operates as follows:

Assuming that its various component elements are in the respective set positions corresponding to the thick-line portions of the drawing, it is clear that when the platform will exert on the pawl 6 a pressure directed towards the rear end of the loading compartment it will be retained by this pawl since its pivotal movement is prevented by the engagement of its catch 45 with the notch or shoulder 46 of lever 47 then locked by stop member 50.

On the other hand, if the linkage section carrying this stop member 50 is moved forwards to an extent sufficient to enable said stop member 50 to release the tip of lever 47, the pressure exerted by the platform on pawl 6, due to the properly calculated angular position of the common plane of contact of said catch and notch, will cause the lever 47 to recede to the position shown in dash-and-dot lines, at 47a, the momentary retraction of this lever permitting the rotation of pawl 6 and therefore releasing the platform.

Under these conditions, this pawl 6 will be retained in its retracted position 6a by the force of its return spring 44. To restore the pawl 6 in its set position, it is only necessary to insert a suitable tool into the upper diametral slot 54 formed in pivot pin 41 and rotate same in the clockwise direction, as seen in FIGURE 6, until its catch 45 re-engages the notch or shoulder 46 of lever 47 constantly urged towards the pawl 6 by its tension spring 49, it only remaining to lock this lever 47 by actuating the linkage means until the stop member 50 resumes its operative or locking position.

In FIGURES 6 and 9 of the drawings, there is also shown a coupling arrangement whereby it is possible to either firmly couple together two adjacent linkage component elements or provide therebetween a certain controlled independence or lost motion, so that a movement of translation of predetermined amplitude can be imparted to the first linkage element without causing this movement to be applied to the other linkage element.

In the specific form of embodiment illustrated therein by way of example two adjacent or successive tubular linkage elements 11 and 11a are interconnected by a solid cylindrical member 55 secured to the rear one 11 of said elements by means of a pair of screws 56 and formed with a diametral hole adapted to receive a retractable spindle 57.

The operative end of this spindle 57 has formed therein a circular groove 58 constantly engaged by a lock bolt 59 urged into said groove by a coil compression spring 60 reacting against an axial screw plug 61, as shown.

Finally, the tubular linkage element 11a has formed therein, in the direction of the diametral plane containing the axes of the aforesaid screws 56 and spindle 57, a pair of elongated holes 62 and 62a engaging with their edges said screws and spindle.

Under these conditions any movement of translation imparted to the tubular member 11 and therefore to the solid extension 55 connected thereto by the pair of screws 51 of stop member 50, will be transmitted to the linkage element 11a through the spindle 57 jointly engaged by the front ends of elongated holes 62 and 62a formed in said element 11a.

Alternately, if the spindle 46 has been withdrawn from its receiving hole the extension 55 will automatically slide into the tubular element 11a and therefore it will not impart thereto the movement previously transmitted to this element 11a by its companion element 11 through said spindle 57. The relative positions of this spindle 57 and of the screws 56, and therefore the length of the elongated holes 62 and 62a, are calculated to correspond to a maximum value of the movement of translation necessary for releasing the notched levers 47 and herefore tripping the retaining pawls 6.

Figure 11:
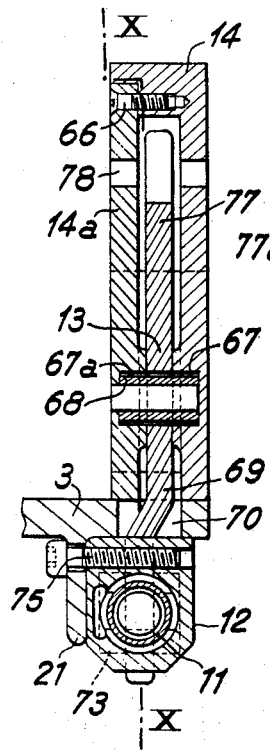
FIGURE 11 is a vertical cross-sectional view of this device, the section being taken along the line XI—XI of FIGURE 10.
Figure 10:
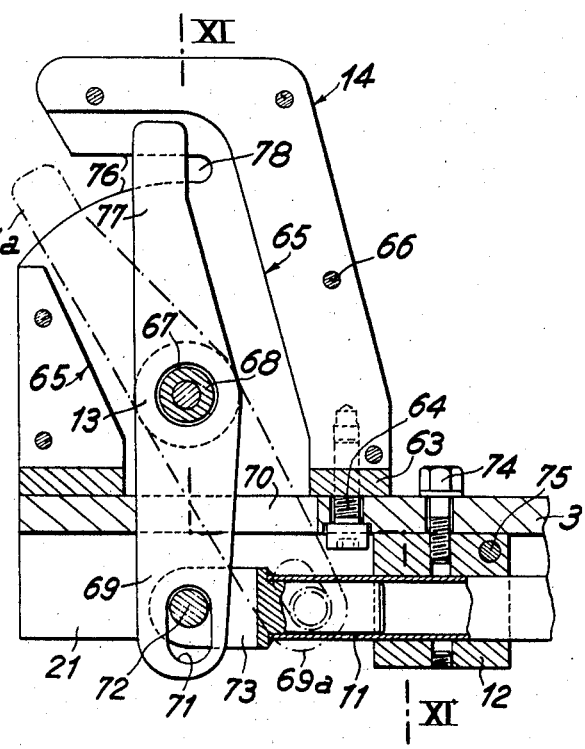
FIGURE 10 is a sectional view taken upon the line X—X of FIGURE 11, of one of the two rear control cases of which the driving rocker is operatively attached to the rear end of a linkage.

The two lateral linkage assemblies thus constituted are attached by their rear ends to the rockers of the rear control cases of which one is illustrated in FIGURES 10 and 11.

These figures show the body 14 of said case as being provided with fastening lugs 63 secured by screws 64 to the web 3 of the relevant guide rail which is provided with a pair of distance-piece forming bosses 65 engaged by its insert plate 14a secured thereto by other screws 66.

These bodies 14 and flanges 14a have formed therein co-axial cylindrical blind holes 67 and 67a respectively, in which the ends of the pivot pin 68 of rocker 13 are journalled for free rotation. The arm 69 of this rocker extends through an aperture 70 formed to this end in the web 3 of guide rail 4 and has formed therein an elongated opening 71 receiving the connecting pin 72 of the coupling strap 73 attached to the relevant linkage system.

This linkage system (of which the first tubular element 11 is visible in these figures) is adapted to slide in smooth frictional engagement in supporting bearings such as 12, which are secured by means of screws 74 and 75 to the web 3 and flange 21 of the corresponding guide rail 4.

Finally, FIGURE 10 shows the contour of the recess 76 formed jointly in the body 14 and insert member 14a of the case. This contour is so designed that when the rocker 13 is in its inoperative position as shown in thick lines, which position corresponds to the maximum backward stroke of the linkage system concerned and is defined by the engagement of the rear face of arm 69 against the registering face of aperture 70, said recess 76 provides, in front of the tip 77 of the arm of rocker 13 which is opposite to the arm 69, a passage 78 for anchoring the release control strap.

Thus, when this strap pulls the tip 77 of said rocker arm, during the unfolding of the parachute attached thereto, the rocker will rotate in the counter-clockwise direction as seen in FIGURE 10 to the inclined position denoted 77a–69a as shown in dash-and-dot lines, whereby a forward movement of translation is imparted to the linkage system, the amplitude of this movement being determined by construction whereby it will correspond to the amplitude required for releasing the retaining pawls.

The front end of the same linkage system will be coupled to the arm driving the corresponding one of the two front control cases jointly illustrated in FIGURES 12, 13 and 14.

In these figures there is shown, mounted against the web 3 of guide rail 4, the body 15 of said case which is closed laterally by a vertical insert plate 15a. The body 15 and plate 15a have cylindrical bearing surfaces 79 and 80 formed therein for rotatably mounting the opposite ends of a shaft 81 on which the driving arm 82 is wedged.

This arm 82 has an elongated opening 71 formed in its lower end and as in the preceding device a pivot pin 72 is engaged in this opening for attaching this arm to the end coupling yoke 73 of the front linkage element 11b.

This front linkage element 11b is connected to the following elements by means of a specific coupling system whereby the partial or complete release or tripping can be controlled from the front end of the loading compartment.

In the form of embodiment proposed herein a lug 83 secured to the front element 11b has a hole formed which is freely engaged by a rod 84, the front, screw-threaded end of this rod being provided with a nut 85 and a lock nut 86.

On the left-hand portion of FIGURE 12 the rear end of this rod 84 is clearly shown as being connected to another lug 83 secured to the rear element 11 of the linkage system which, by sliding in the support 12, is pivotally connected by means of a pin 72 of its end yoke 73 to the arm 69 of the rocker of the rear control case, as in the arrangement already described hereinabove.

It is clear that the provision of the rod 84 which, due to its mobility through the lugs 83, is subjected only to tractive efforts, permits of impressing to the rear linkage element 11, by the traction produced by means of driving arm 82 of the front control case, a movement of translation which said linkage element is caused to receive differently, by thrust, from the arm 69 of the rocker of said rear control case.

As also shown in FIGURE 12, the front element 11b cut from solid bar stock has its rear end hollowed to provide a chamber 87 closed by a screw-plug 88 and this chamber 87 has pivotally mounted therein a double-ended catch member 89 fulcrumed about an intermediate pivot pin 90.

The oppositely directed retaining or hook portions 91 of this catch member extend through corresponding elongated apertures 92 formed in the wall of said chamber, and this double catch member 89 is constantly urged for rotation in the counter-clockwise direction by a hairpin spring 93.

The same front element 11b engages, and is in smooth frictional contact with, the inner wall of a receiving socket 94 secured to the end of the intermediate element 11a following said first element 11b. At a suitably selected point of said socket another opening 95 is formed and the lowermost of the two apertures 92 formed in the aforesaid chamber 87 of element 11b is adapted to register with said opening 95 when the element 11b is moved into the socket 94.

The operation of the device thus constructed and of the linkage system kinematically responsive therewith is tributary of the length of the movement of translation accomplished by the front element 11b and consequently it is a function of the angular amplitude of the pivotal movement impressed to the driving arm 82.

This amplitude may be given (in addition to its maximum value corresponding to the free movement of said driving arm within its case) a reduced value controlled by a locking mechanism adapted to act upon said driving arm by reducing its permissible angular movement, this result being obtained by simply shifting forwards its initial postion.

In this example the preventer mechanism mentioned in the preceding paragraph consists very simply of a cylindrical rod 96 provided with a control lever and adapted to slide and rotate through a pair of axially aligned bearing-forming or like bores formed jointly in the lateral wall of the case body 15 and in the web 3 of guide rail 4. A third aligned hole is formed in the insert plate 15a of this case; in the locking position, the end of rod 96 is adapted to engage, and bear in, said third hole (FIGURE 13).

Finally, the rod 96 has two circular grooves 97 formed therein which are interconnected by a longitudinal straight groove 98, these grooves being normally engaged by the tip of a set screw 99 carried by the case body 15. While the groove 98 permits the longitudinal sliding movement of rod 96 from one of its two positions respectively of engagement and disengagement, according as it lies in the path of driving arm 82 or permits its free movement, the end grooves 97 are adapted, by simply rotating said rod, to lock same in each one of said end positions.

From FIGURE 12 it appears clearly that when the driving arm is pivoted from its initial, forwardly-shifted position 82 (resulting from its engagement with rod 96) to the foremost end position 82a shown in dash-and-dot lines, the leading element 11b of the linkage system directly coupled thereto will perform a movement of translation of limited length which is transmitted integrally to the rear element 11 through the pull rod 84.

The position of rod 96 is calculated by construction so that the value of this limited stroke will actually correspond to the one necessary to cause the rod to produce a fractional tripping of the retaining pawls, as consistent with gravity or partial emergency jettisoning operations prepared before the take-off by mutually attaching some of the elements of said linkage system by means of said connecting spindles 57.

On the other hand, when the rod 96 is brought to its retracted position the driving arm can be moved to its endmost starting position 82b in which the leading linkage element 11b will accomplish a backward movement of a length sufficient to penetrate into the socket 94 until the lower aperture 92 of said element 11b, by registering with the opening 95 of said socket 94, will enable the rear retaining or hook portion 91 of the double-ended catch member 89 to penetrate into this last-named opening 95, so as to firmly couple the two elements 11b and 11a together.

During this preliminary step the rod 84 will have slid in the receiving hole of the front lug 83 so that the trailing linkage element 11 to which it is attached by its rear end will not be affected by the backward movement of its companion element 11b ahead.

If, under these conditions, the driving arm is pivoted from the rearmost position 82b to the foremost position 82a, the leading element 11b will accomplish its movement of translation having the maximum stroke and this movement will be transmitted thereby integrally to the next element 11a through the medium of the above-described coupling device (comprising said double-ended catch member 89), this operation producing in this case the complete emergency jettisoning.

Finally, the drawings also show on the one hand the end portion of the trasverse shaft 16 coupled by slot-and-tenon joints with the shafts 81 of driving arms 82 in the two front control cases so that the pivotal movements of these arms can take place with the necessary strict synchronism, and on the other hand the detachable control levers 17 which may be mounted on only one or both of said cases, the inner end of each lever 17 fitting in a diametral cylindrical hole 100 formed in the hubs of said driving arms.

Figure 15:
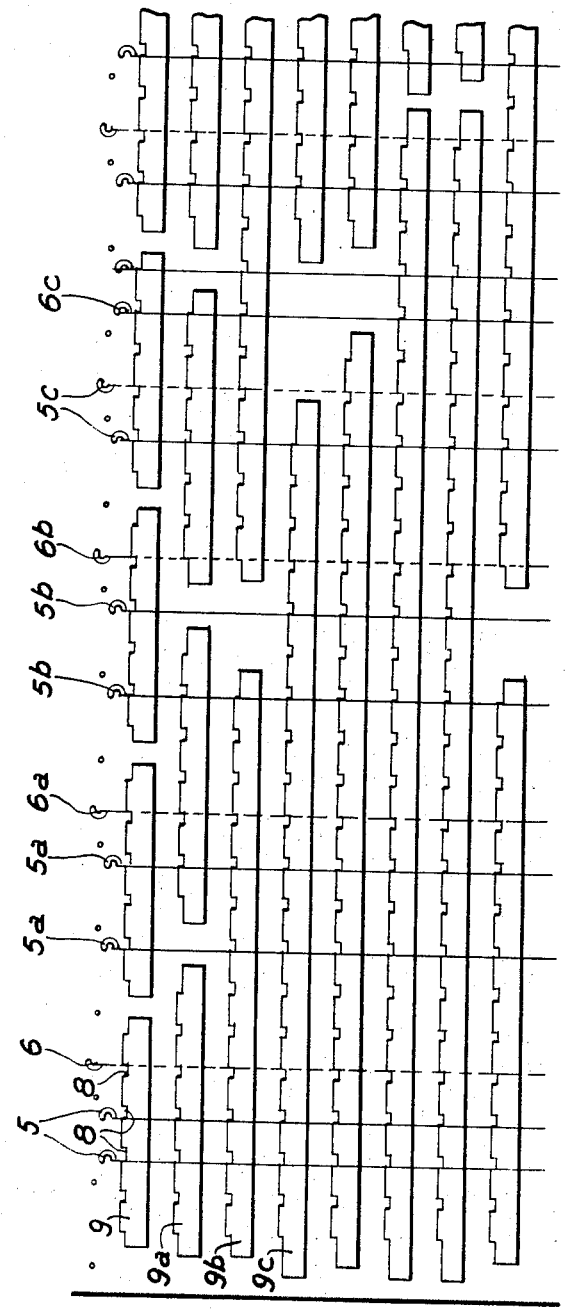
FIGURE 15 is one fraction of a diagram aiming at evidencing the multifarious solutions of loading problems that can be solved by means of equipments derived from the present invention.

The partial diagram shown in FIGURE 15 evidences the great flexibility of operation of the assembly of means described hereinabove. In this respect it proves that a same arrangement of abutment and retaining pawls such as shown diagrammatically at 5 and 6, 5a and 6a, 5b and 6b, 5c and 6c . . . is convenient for stowing in the loading compartment of an aircraft a considerable number of platforms of different lengths, these platforms being represented in this diagram in the form of one of their longitudinal side members such as 9, 9a, 9b, 9c . . . in which the gripping notches 8 are formed at spaced intervals.

What I claim is:

1. A device for the combined guiding and stowing, in both transverse and vertical directions, of platforms sliding on rails in an aircraft, and also for retaining said platforms against any undesired forward or backward movements, and releasing said platforms either by parachuting or by actuating a separate manual control, which comprises two parallel T-sectioned lateral guide rails disposed symmetrically in relation to the longitudinal center line of the aircraft, each said rail having a central web and laterally projecting wings, platforms adapted to slide on said rails and formed with spaced notches along their lateral edges, two symmetrical groups of pawls of two different types, constituting abutment pawls and retaining pawls, respectively, which are pivotally mounted on the wings of said guide rails, said abutment pawls extending through the webs of said rails and abutting against the front of said notches for preventing the forward movement of said platforms, and receding against the antagonistic action of return springs when said abutment pawls emerge at the rear of said notches, said retaining pawls also extending through the web of said rails and being adapted on the one hand to resiliently recede when said platforms are moved forwards and on the other hand to positively lock said platforms against backward movements, a pair of rockers pivotally mounted on either side at the rear end of said rails, straps connecting said rockers to a parachute, telescopic linkage rods aligned under the wings of said rails and connected to said rockers, latches carried by said linkage rods which register with said retaining pawls so as to lock same against the action of resilient return means, at least one lever fulcrumed to the front end of said rails, a pair of rods connected to said lever and extending beneath said rail wing, means for operatively connecting said rods to said rocker linkage rods for controlling the release of said platforms through said rockers or through said lever.

2. A device as set forth in claim 1, which comprises, for each abutment pawl abutting at the front against the edge of the rail aperture through which it projects and at the rear against the notch formed in the edge of said platform, a thrust spring aligned with the rail axis and a resilient heel member for locking said pawl against the forward movement of said platform.

3. A device as set forth in claim 1, which comprises for each retaining pawl a spring adapted constantly to urge said retaining pawl to a position in which it is free from the rail aperture through which it projects, a lever formed with a heel portion which is fulcrumed on the web of said rail and adapted normally to lock the tail end of said retaining pawl, another return spring, constantly urging said lever to its pawl-locking position, the tail end of said lever being shaped to engage the lock member of the linkage rod of the rear rocker.

4. A device as set forth in claim 1, which comprises detachable studs for interconnecting the ends of the aligned telescopic linkage rods, elongated holes formed through the ends of each linkage rod, and studs rigid with each rod end and adapted to move freely in said elongated holes.

5. A device as set forth in claim 1, which comprises a manual control lever fulcrumed about a transverse pivot pin carried by the front end of at least one rail, a rod responsive to said lever and disposed beneath the wing of each rail in the vicinity of said rear rocker linkage rod, and means for operatively connecting the opposite end of said lever-actuated rod to the rocker linkage rod, in the vicinity of said rocker.

6. A device as set forth in claim 5, which comprises means for detent-positioning the rod responsive to said manual control lever with respect to the front end of said rocker linkage rod.

References Cited

UNITED STATES PATENTS 3,335,983  8/1967  Mollon et al. _____ 244—137
3,357,372  12/1967  Bader _____ 244—137X MILTON BUCHLER, *Primary Examiner.*

T. W. BUCKMAN, *Assistant Examiners.*

U.S. Cl. X.R.

105—369; 244—118